Patented Nov. 9, 1948

2,453,186

UNITED STATES PATENT OFFICE 2,453,186

HOT-WATER TREATMENT OF VINYL RESIN LIGHT-POLARIZING SHEET

Frederick J. Binda, Cambridge, Mass., assignor to Polaroid Corporation, Cambridge, Mass., a corporation of Delaware No Drawing. Application May 15, 1947, Serial No. 748,337

2 Claims. (Cl. 18—48)

1

This invention relates to a light-polarizing material and more particularly to a method of manufacturing light-polarizing material. It is a continuation-in-part of my application Ser. No. 588,706, filed April 16, 1945, now U. S. Patent No. 2,445,555, for Light polarizer sheet and process of manufacture.

This invention contemplates a simple process for effecting some improvements in polarizing sheet such as that produced in accordance with the disclosure made in U. S. Patent 2,255,940 to Rogers. However, in lieu of the relaxing and restretching steps of the disclosure made in the above patent to Rogers, the present improvement merely subjects the sheeted material to hot water and results in a considerably simplified process. This is particularly true in view of the sheet at best being relatively fragile and the restretching and relaxing step of the prior art being frequently accompanied by breaking of the treated and thereby weakened sheet.

In the present process such intensive treatment of the thin sheet material is dispensed with and the use of hot water to effect the production of a highly improved film is capable of being carried out in a more nearly continuous process unlimited by the batch processing of the prior art.

It is an object of this invention to provide a process for improving the quality of light-polarizing sheets or films of the type described in U. S. Patents 2,173,304 and 2,255,940.

Another object of the invention is to provide an inexpensive process for producing a highly efficient light-polarizing sheet.

Further objects of the invention are to provide processes wherein sheets or films of the polarizing material described in the above patents are subjected to a hot aqueous bath while simultaneously being maintained in stretched condition under tension.

Other objects of the invention will in part be obvious and will in part appear hereinafter.

To this end the invention provides a process for the production of a sheet or film of light-polarizing material consisting of a transparent plastic having long molecules, and more specifically a polyvinyl hydroxy alkane, with its molecules oriented to substantial parallelism and which is differentially absorbing to components of an incident beam of light vibrating in different directions.

The invention accordingly comprises the several steps and the relation of one or more of such steps with respect to each of the others which are exemplified in the following disclosure and

2 the scope of which will be indicated in the claims.

In U. S. Patents 2,173,304 and 2,255,940 there is described a light polarizer comprising a sheet or film of an organic plastic, preferably a polyhydroxy alkane such, for example, as a vinyl resin, (i. e., a polyvinyl alcohol, polyvinyl acetal or a polyvinyl ketal) and which has long, straight-chain molecules, some of which are dichroic and some of which are negligibly dichroic, the dichroic molecules being oriented to substantial parallelism within the sheet and being the product of an alteration within the sheet of the molecular structure of the negligibly dichroic molecules. Where polyvinyl alcohol is employed in the production of light polarizers of the type described, the sheet-like polarizer may comprise polyvinyl alcohol containing molecules of dehydrated polyvinyl alcohol or molecules of a heat alteration product of polyvinyl alcohol which are dichroic. These dichroic molecules are oriented within the sheet, for example, by a stretching process in which the treated sheet may be extended two to circa six or even as much as eight times its original length. Preferably, the extension of the sheet is accomplished while the sheet is in a softened condition as a result of the application of heat, and the extension is to a degree which causes substantially complete orientation of the dichroic molecules within the sheet. These molecules are formed by heating the polyvinyl alcohol sheet, which may or may not have been previously treated with an acid such, for example, as sulfuric acid, to a temperature at which a polarizing stain appears in the sheet. Speaking generally, this temperature may be in the neighborhood of 175° C. It may, however, considerably exceed this temperature, successful results having been achieved with temperatures in the neighborhood of 205° C. It may also, and particularly where the polyvinyl alcohol sheet is subjected to an acid treatment, be considerably less than the temperature specified. In this connection satisfactory results have been achieved with temperatures in the neighborhood of 150° C.

The dichroic molecules in the polarizing sheet are hydrocarbon long straight-chain molecules having extended systems of conjugated double bonds.

The above patents point out that while light polarizers of the type described may be produced preferably from sheets of polyvinyl alcohol, other materials may be employed and specifically other vinyl resins such, for example, as polyvinyl acetal, polyvinyl ketal, and, more generally, other linear polymers built up from straight chains of carbon atoms.

This invention contemplates the further treatment of light-polarizing sheets, such as those disclosed in the said patents, to improve the polarizing properties thereof and to alter the color desirably.

In the practice of the present invention a stretched or otherwise extended sheet, for example a light-polarizing sheet of polyvinyl alcohol containing oriented molecules of a dichroic alteration product of polyvinyl alcohol, is subjected in stretched condition while maintaining such tension on said sheet as to prevent shrinkage or relaxation thereof, to an aqueous bath at a temperature of at least 125° F. for 3 minutes in batch processing, while a temperature of 190°–212° F. in continuous methods for a period of time, i. e., 10 to 30 seconds, is sufficient to effect the desired improved qualities. This treatment has been found to greatly improve the polarizing properties of the sheet.

After an initial drying the sheet may be heated to a temperature slightly below the boiling point of water, for example to a temperature of approximately 90° C., and thoroughly dried at that temperature. The sheet thus obtained has polarizing properties that are generally and substantially improved by the treatment described.

Another embodiment exemplifying the methods of this invention is illustrated below. A sheet of polyvinyl alcohol .0018 inch thick was subjected to hot-water treatment while being maintained under tension in its stretched condition in accordance with the following tabulation:

|  | I | II |
| --- | --- | --- |
| Before Hot-Water Treatment: | | |
| Percent Transmission Single Sheet | 26 | 26 |
| Percent Transmission in Crossed Position | .035 | .035 |
| Treatment: | | |
| Temperature °F | 125 | 156 |
| Time min | 3 | 3 |
| After Hot-Water Treatment: | | |
| Percent Transmission Single Sheet | 30 | 33.5 |
| Percent Transmission in Crossed Position | .019 | .016 |

The extended time interval of 3 minutes given above is merely for experimental purposes. With higher temperatures, preferably below 175° F. at which temperature the sheet tends to break or part, shorter and shorter time intervals of treatment are necessary. It is preferred in the case of very thin sheeting, i. e., .0007 inch thick for example, that an upper limit of 160° F. to be used.

The highly effective results obtained by this hot-water treatment are amply illustrated in the higher transmission of the finished sheet as well as the more highly polarized transmitted light beam, vide the extremely low transmission (.016) when two sheets are traversed in crossed position.

While the process of the present invention has been described in connection with light-polarizing sheets formed from polyvinyl alcohol, it is to be understood that it may be applied to products derived from linear polymers of the type heretofore described more generally.

Since certain changes may be made in carrying out the above process without departing from the scope of the invention, it is intended that all matter contained in the above description shall be interpreted as illustrative and not in a limiting sense.

What is claimed is:

1. In the process of forming a light polarizer comprising a light-transmitting sheet of organic plastic material from the class consisting of polyvinyl alcohols, polyvinyl acetals and polyvinyl ketals, which sheet has been extended to substantially orient the molecules thereof and heated in the presence of an acid accelerator to form therein substantially oriented long straight-chain molecules having extended systems of conjugated double bonds, the further steps of thereafter subjecting said sheet to hot water of a temperature of at least 125° F. while maintaining the sheet in extended condition under tension, whereby the light-polarizing properties of said sheet are improved, drying and cooling said sheet.

2. In the process of forming a light polarizer comprising a light-transmitting sheet of organic plastic material from the class consisting of polyvinyl alcohols, polyvinyl acetals and polyvinyl ketals, which sheet has been extended to substantially orient the molecules thereof and heated in the presence of an acid accelerator to form therein substantially oriented long straight-chain molecules having extended systems of conjugated double bonds, the further steps of thereafter subjecting said sheet to hot water of a temperature in excess of 125° F. but substantially less than the temperature to which said sheet was subjected in the presence of said acid accelerator, whereby the light-polarizing properties of said sheet are improved, drying and cooling said sheet.

FREDERICK J. BINDA.

REFERENCES CITED

The following references are of record in the file of this patent:

UNITED STATES PATENTS

| Number | Name | Date |
| --- | --- | --- |
| 2,173,304 | Land et al. | Sept. 19, 1939 |